(12) United States Patent
Noh et al.

(10) Patent No.: US 8,953,483 B2
(45) Date of Patent: Feb. 10, 2015

(54) METHOD AND APPARATUS FOR TRANSMITTING APERIODIC SOUNDING REFERENCE SIGNAL IN WIRELESS COMMUNICATION SYSTEM

(75) Inventors: Min Seok Noh, Anyang-si (KR); Yeong Hyeon Kwon, Anyang-si (KR); Sung Ho Moon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 13/697,753

(22) PCT Filed: May 16, 2011

(86) PCT No.: PCT/KR2011/003593
§ 371 (c)(1),
(2), (4) Date: Nov. 13, 2012

(87) PCT Pub. No.: WO2011/142640
PCT Pub. Date: Nov. 17, 2011

(65) Prior Publication Data
US 2013/0058306 A1    Mar. 7, 2013

Related U.S. Application Data

(60) Provisional application No. 61/334,959, filed on May 14, 2010, provisional application No. 61/346,480, filed on May 20, 2010, provisional application No. 61/348,257, filed on May 26, 2010.

(30) Foreign Application Priority Data

Mar. 31, 2011    (KR) .......................... 10-2011-0029544

(51) Int. Cl.
H04L 5/00        (2006.01)
H04L 1/16        (2006.01)
H04W 72/12       (2009.01)

(52) U.S. Cl.
CPC ............ H04L 5/0048 (2013.01); H04L 1/1671 (2013.01); H04L 5/0007 (2013.01); H04W 72/1289 (2013.01)
USPC ........................................................ 370/252

(58) Field of Classification Search
USPC ........................................ 370/252, 328, 329
See application file for complete search history.

(56) References Cited

U.S. PATENT DOCUMENTS

2011/0085458 A1*    4/2011    Montojo et al. .............. 370/252
2012/0170497 A1*    7/2012    Zhang et al. .................. 370/311

(Continued)

OTHER PUBLICATIONS

LG Electronics Inc., "Dynamic Aperiodic Sounding for LTE-Advanced," 3GPP TSG RAN WG1 Meeting #61, Agenda Item 6.5.2.1, R1-102731, May 10-14, 2010, Montreal, Canada, 4 pages.

(Continued)

Primary Examiner — Kerri Rose
(74) Attorney, Agent, or Firm — Birch, Stewart, Kolasch & Birch, LLP

(57) ABSTRACT

A method and apparatus for transmitting an aperiodic sounding reference signal (SRS) in a wireless communication system is provided. The method include receiving a downlink control information (DCI) format including a triggering signal for triggering a transmission of an aperiodic SRS from a base station (BS) via a physical downlink control Channel (PDCCH), blind-decoding the PDCCH in a UE-specific search space, and transmitting the aperiodic SRS triggered based on the triggering signal to the BS.

15 Claims, 4 Drawing Sheets

(56) References Cited

U.S. PATENT DOCUMENTS

2013/0128838 A1* 5/2013 Montojo et al. .............. 370/329
2013/0128855 A1* 5/2013 Noh et al. .................... 370/329
2013/0201932 A1* 8/2013 Ko et al. ...................... 370/329
2013/0229993 A1* 9/2013 Yang et al. ................... 370/329

OTHER PUBLICATIONS

Samsung, Resource Allocation for Dynamic SRS Activation and SRS Multiplexing, 3GPP TSG RAN WG1 #60bis, Agenda Item 6.5.2, R1-102215, Apr. 12-15, 2010, Beijing, China, 3 pages.

Nokia Siemens Networks et al., "Dynamic aperiodic SRS," 3GPP TSG RAN WG1 Meeting #61, May 10-14, 2010, 2 pages, R1-102966.

Texas Instruments, "Signaling considerations for dynamic aperiodic SRS," 3GPP TSG RAN WG1 #61, May 10-14, 2010, pp. 1-4, R1-102830.

3GPP TSG RAN WG1 Meeting #60bis, R1-101985, "Further Discussion on Aperiodic Sounding", Mediatek Inc., Agenda Item: 6.5.2, pp. 1-2, Apr. 12-16, 2010.

3GPP TSG RAN WG1 Meeting #60bis, "Design and Configuration Considerations on Aperiodic SRS for LTE-A", Research In Motion, UK Limited., Agenda Item: 6.5.2, pp. 1-6, Apr. 12-16, 2010.

3GPP TSG RAN WG1 Meeting #60bis, R1-102142, "Views on SRS Enhancements for LTE-A", Motorola, Agenda Item: 6.5.2, pp. 1-5, Apr. 12-16, 2010.

3GPP TSG RAN WG1 Meeting #60bis, R1-102357, "Discussion on Dynamic Aperiodic Sounding", ASUSTeK, Agenda Item: 6.5.2, pp. 1-2, Apr. 12-16, 2010.

3GPP TSG-RAN WG1#60 bis, R1-101819, "Consideration on dynamic aperiodic sounding", ZTE, agenda item: 6.5.2, pp. 1-3, Apr. 12-16, 2010.

* cited by examiner

METHOD AND APPARATUS FOR TRANSMITTING APERIODIC SOUNDING REFERENCE SIGNAL IN WIRELESS COMMUNICATION SYSTEM

This application is the National Phase of PCT/KR2011/003593 filed on May 16, 2011, which claims priority under 35 U.S.C. 119(e) to U.S. Provisional Application Nos. 61/334,959 filed on May 14, 2010, 61/346,480 filed on May 20, 2010, 61/348,257 filed on May 26, 2010, and under U.S.C. 119(a) to Patent Application No. 10-2011-0029544 filed in the Republic of Korea on Mar. 31, 2011, all of which are hereby expressly incorporated by reference into the present application.

TECHNICAL FIELD

The present invention relates to wireless communication and, more particularly, to a method and apparatus for transmitting an aperiodic sounding reference signal in a wireless communication system.

BACKGROUND ART

In wireless communication systems, it is necessary to estimate an uplink channel or a downlink channel for the purpose of the transmission and reception of data, the acquisition of system synchronization, and the feedback of channel information. In wireless communication system environments, fading is generated because of multipath time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h} = y/p = h + n/p = h + \hat{n} \qquad \text{<Equation 1>}$$

The accuracy of the channel estimation value ĥ estimated using the reference signal p is determined by the value n̂. To accurately estimate the value h, the value n̂ must converge on 0. To this end, the influence of the value n̂ has to be minimized by estimating a channel using a large number of reference signals. A variety of algorithms for a better channel estimation performance may exist.

An uplink reference signal may be classified into a demodulation reference signal (DMRS) and a sounding reference signal (SRS). The DMRS is a reference signal used for a channel estimation to modulate a received signal. The DMRS can be coupled with a PUSCH or PUCCH transmission. The SRS is a reference signal transmitted by a user equipment (UE) to a base station (BS) for uplink scheduling. The BS estimates an uplink channel through the received SRS and uses the estimated uplink channel for uplink scheduling. The SRS may be periodically transmitted or may be triggered by the BS and aperiodically transmitted to the BS when the BS requires a transmission of the SRS.

A triggering message of the BS for triggering an aperiodic transmission of the SRS can be considered in various manners.

SUMMARY OF INVENTION

Technical Problem

The present invention provides a method and apparatus for transmitting an aperiodic sounding reference signal (SRS) in a wireless communication system.

Solution to Problem

In an aspect, a method for transmitting an aperiodic sounding reference signal (SRS) by a user equipment (UE) in a wireless communication system is provided. The method include receiving a downlink control information (DCI) format including a triggering signal for triggering a transmission of an aperiodic SRS from a base station (BS) via a physical downlink control Channel (PDCCH), blind-decoding the PDCCH in a UE-specific search space, and transmitting the aperiodic SRS triggered based on the triggering signal to the BS.

The DCI format may include a DCI used for scheduling a physical uplink shared channel (PUSCH), or includes a DCI used for scheduling a single physical downlink shared channel (PDSCH) codeword.

The DCI format may include cyclic redundancy checking (CRC) masked by a cell radio network temporary identifier (C-RNTI).

The triggering signal may have a size of 1 bit.

The transmission of the aperiodic SRS may be triggered if the value of the triggering signal is 1.

The method may further include receiving an aperiodic SRS activation signal indicating whether or not the aperiodic SRS is triggered by the triggering signal from the BS.

The aperiodic SRS activation signal may have a size of 1 bit.

The DCI format may include at least one parameter defining the aperiodic SRS.

The triggering signal may be mapped to a frequency hopping flag field of the DCI format including the DCI used for scheduling the PUSCH so as to be received.

The DCI format may be mapped to an information bit, has CRC added thereto, performs channel coding, is subjected to rate matching, and then is received.

In another aspect, a user equipment (UE) in a wireless communication system is provided. The UE include a radio frequency (RF) unit, and a processor, coupled to the RF unit, and configured to receive a downlink control information (DCI) format including a triggering signal for triggering a transmission of an aperiodic sounding reference signal (SRS) from a base station (BS) via a physical downlink control channel (PDCCH), and transmit the aperiodic SRS triggered based on the triggering signal to the BS, and the processor blind-decodes the PDCCH in a UE-specific search space.

Advantageous Effects of Invention

According to exemplary embodiments of the present invention, a triggering message for triggering an SRS can be defined.

MODE FOR THE INVENTION

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ Generation, Partnership Project) LTE (Long Term Evolution) is part of an evolved UMTS (E-UMTS) using the E-UTRA, which employs the OFDMA in downlink and the SC-FDMA in uplink. LTE-A (Advanced) is an evolution of 3GPP LTE.

Hereinafter, for clarification, LET-A will be largely described, but the technical concept of the present invention is not meant to be limited thereto.

Figure 1:
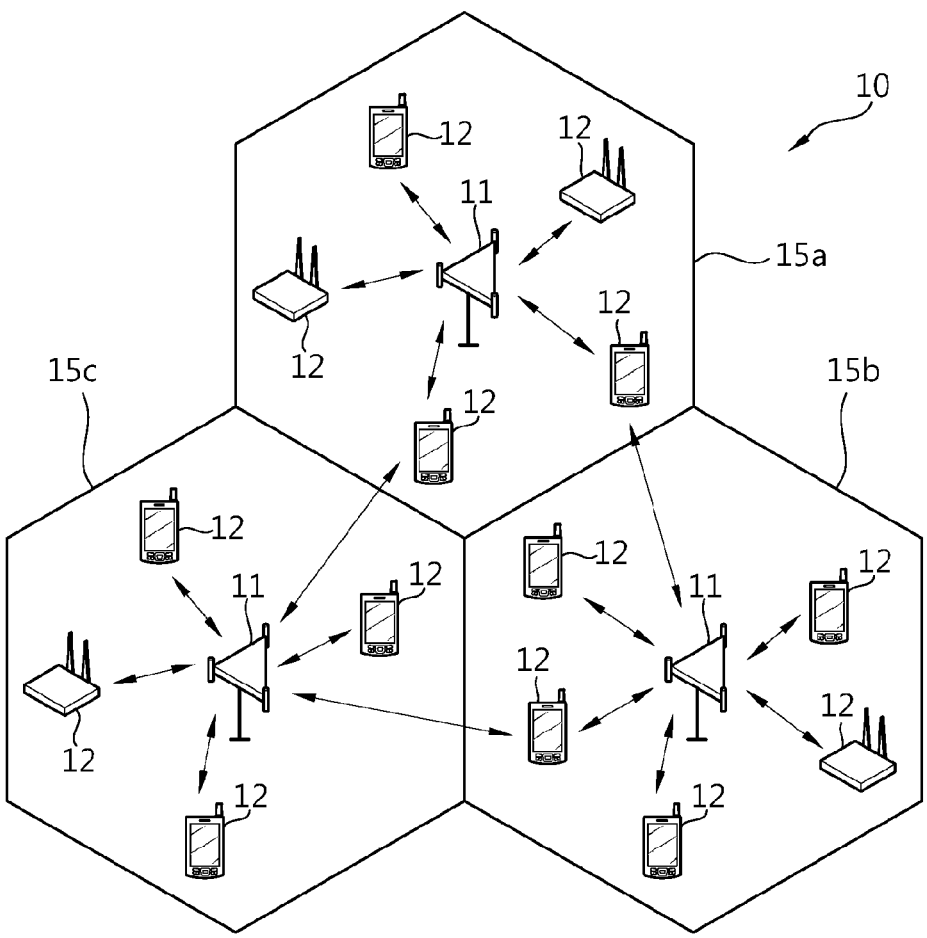
FIG. 1 illustrates a wireless communication system.

FIG. 1 illustrates a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (Mobile Station), MT (Mobile Terminal), UT (User Terminal), SS (Subscriber Station), wireless device, PDA (Personal Digital Assistant), wireless modem, handheld device. The BS 11 generally refers to a fixed station that communicates with the UE 12 and may be called by other names such as eNB (evolved-NodeB), BTS (Base Transceiver System), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a MIMO (Multiple-Input Multiple-Output) system, a MISO (Multiple-Input Single-Output) system, an SISO (Single-Input Single-Output) system, and an SIMO (Single-Input Multiple-Output) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
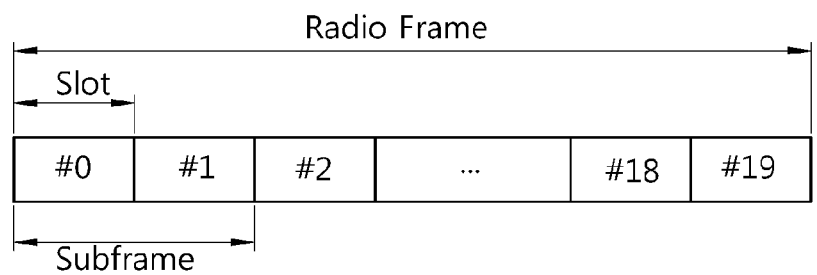
FIG. 2 illustrates the structure of a radio frame in 3GPP LTE.

FIG. 2 illustrates the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd Generation Partnership Project) TS 36.211 V8.2.0 (2008-03). With reference to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix and one slot includes six OFDM symbols in an extended CP.

The wireless communication system may be divided into an FDD (Frequency Division Duplex) scheme and a TDD (Time Division Duplex) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
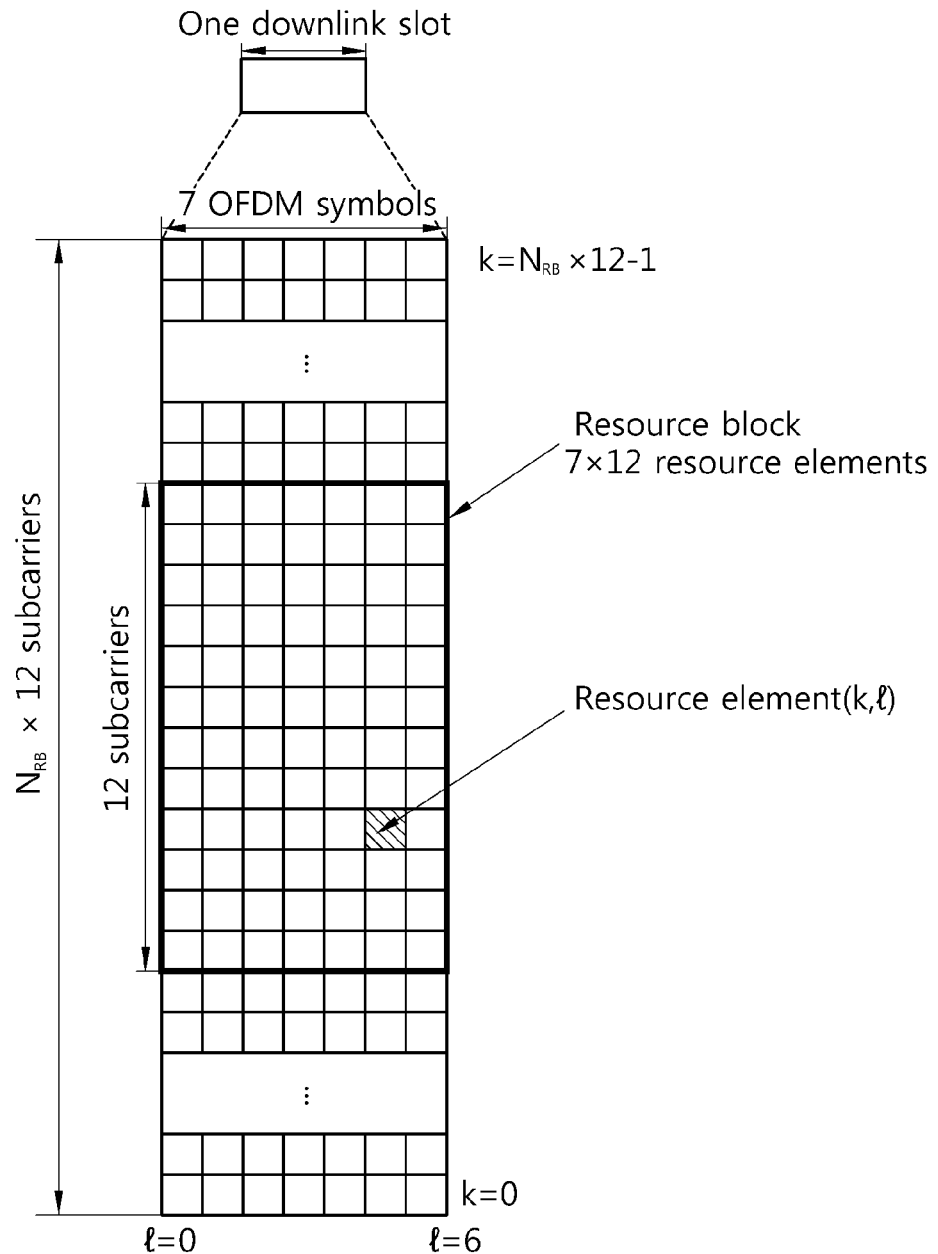
FIG. 3 illustrates an example of a resource grid of a single downlink slot.

FIG. 3 illustrates an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k ($k=0, \ldots, N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
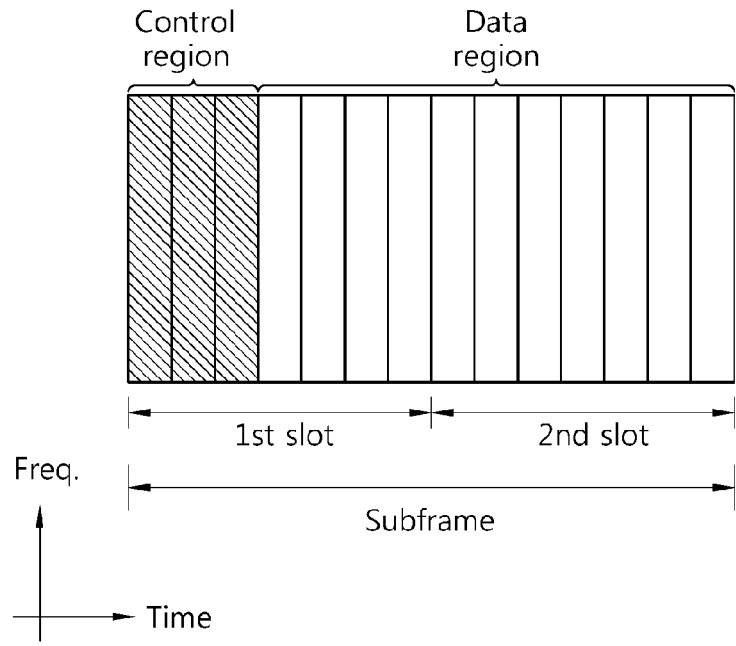
FIG. 4 illustrates the structure of a downlink subframe.

FIG. 4 illustrates the structure of a downlink subframe.

A downlink subframe includes two slots in the time domain, and each of the slots includes seven OFDM symbols in the normal CP. First three OFDM symbols (maximum four OFDM symbols with respect to a 1.4 Mhz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a DL-SCH (Downlink-Shared Channel), resource allocation information of a UL-SCH (Uplink Shared Channel), paging information on a PCH, system information on a DL-SCH, a resource allocation of an higher layer control message such as a random access response transmitted via a PDSCH, a set of transmission power control commands with respect to individual UEs in a certain UE group, an activation of a VoIP (Voice over Internet Protocol), and the like. A plurality of PDCCHs may be transmitted in the control region, and a UE can monitor a plurality of PDCCHs. The PDCCHs are transmitted on one or an aggregation of a plurality of consecutive CCE (Control Channel Elements). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a CRC (Cyclic Redundancy Check) to the DCI. A unique RNTI (Radio Network Temporary Identifier) is masked on the CRC according to the owner or the purpose of the PDCCH. In case of a PDCCH for a particular UE, a unique identifier, e.g., a C-RNTI (Cell-RNTI), of the UE, may be masked on the CRC. Or, in case of a PDCCH for a paging message, a paging indication identifier, e.g., a P-RNTI (Paging-RNTI), may be masked on the CRC. In case of a PDCCH for an SIB (System Information Block), a system information identifier, e.g., an SI-RNTI (System Information-RNTI), may be masked on the CRC. In order to indicate a random access response, i.e., a response to a transmission of a random access preamble of the UE, an RA-RNTI (Random Access-RNTI) may be masked on the CRC. The CRC-attached DCI may undergo channel coding and rate matching and then transmitted.

For example, a DCI format 0 may include the following fields. The DCI format 0 may be used for scheduling a PUSCH (Physical Uplink Shared Channel).

Frequency hopping flag: 1 bit

Resource block assignment and hopping resource allocation field

Modulation and coding scheme and redundancy version field: 5 bits

New data indicator field: 1 bit

TPC command field for a scheduled PUSCH: 2 bits

Cyclic shift field for DMRS: 3 bits

Uplink (UL) index field: 2 bits

Downlink assignment index (DAI) field: 2 bits

CQI request field: 1 bit

These fields may be mapped in the described order. Namely, the flag field for a DCI format 0/1A may be mapped to the forefront of information bits, and thereafter, the other remaining fields may be mapped in order. Also, the MSB (Most Significant Bit) may be mapped to the front of the information bits in each field. The DCI format 1A may be used to schedule a single PDSCH codeword. Meanwhile, when the size of the DCI format 0 is smaller than that of the DCI format 1A, 0 bit may be padded until when the size of the DCI format 0 is equal to that of the DCI format 1A.

Figure 5:
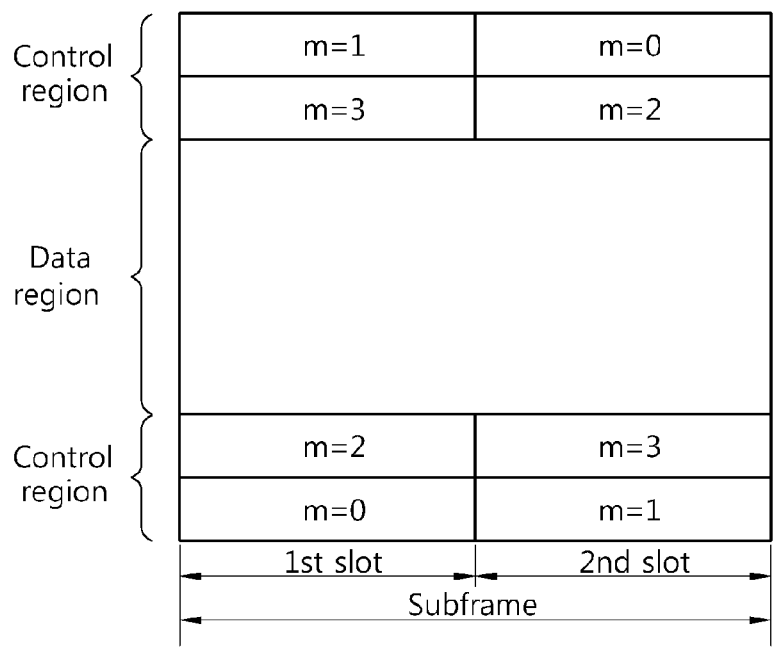
FIG. 5 illustrates the structure of an uplink subframe.

FIG. 5 illustrates the structure of an uplink subframe.

An uplink subframe may be divided into a control region and a data region in the frequency domain. A PUCCH (Physical Uplink Control Channel) for transmitting uplink control information is allocated to the control region. A PUSCH (Physical Uplink Shared Channel) for transmitting data is allocated to the data region. When indicated by an higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include HARQ (Hybrid Automatic Repeat reQuest) ACK (Acknowledgement)/NACK (Non-acknowledgement), a CQI (Channel Quality Indicator) indicating the state of a downlink channel, an SR (Scheduling Request), and the like.

The PUSCH is mapped to a UL-SCH (Uplink Shared Channel), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a PMI (Precoding Matrix Indicator), an HARQ, an RI (Rank Indicator), or the like. Or the uplink data may include only control information.

An uplink reference signal will now be described.

A reference signal is generally transmitted as a sequence. A reference signal sequence is not particularly limited and a certain sequence may be used as the reference signal sequence. As the reference signal sequence, a sequence generated through a computer based on PSK (Phase Shift Keying) (i.e., a PSK-based computer generated sequence) may be used. The PSK may include, for example, BPSK (Binary Phase Shift Keying), QPSK (Quadrature Phase Shift Keying), and the like. Or, as the reference signal sequence, a CAZAC (Constant Amplitude Zero Auto-Correlation) may be used. The CAZAC sequence may include, for example, a ZC (Zadoff-Chu)-based sequence, a ZC sequence with cyclic extension, a ZC sequence with truncation, and the like. Also, as the reference signal sequence, a PN (pseudo-random) sequence may be used. The PN sequence may include, for example, an m-sequence, a sequence generated through a computer, a gold sequence, a Kasami sequence, and the like. Also, a cyclically shifted sequence may be used as the reference signal sequence.

An uplink reference signal may be classified into a DMRS (Demodulation Reference Signal) and an SRS (Sounding Reference Signal). The DMRS is a reference signal used for a channel estimation to demodulate a received signal. The DMRS may be combined with a transmission of the PUSCH or the PUCCH. The SRS is a reference signal transmitted by the UE to the BS for uplink scheduling. The BS estimates an uplink channel through the received SRS and uses the estimated uplink channel in uplink scheduling. The SRS is not combined with the transmission of the PUSCH or the PUCCH. The same type of basic sequence may be used for the DMRS and the SRS. Meanwhile, in an uplink multi-antenna transmission, precoding applied to the DMRS may be the same as that applied to the PUSCH. A cyclic shift separation is a primary scheme for multiplexing the DMRS. In the LTE-A system, SRS may not be precoded, or may be an antenna-specified reference signal.

The SRS is a reference signal transmitted by the UE or a relay station (RS) to the BS, which is not related to an uplink data or control signal transmission. The SRS is generally used to estimate channel quality for frequency selective scheduling in uplink, or may be used for a different purpose. For example, the SRS may be also used for power controlling, an initial MCS selection, initial power controlling for a data transmission, and the like. The SRS is generally transmitted in a final SC-FDMA symbol of a subframe.

An SRS sequence is defined to be $r_{SRS}(n) = r_{u,v}^{(\alpha)}(n)$. A reference signal sequence $r_{u,v}^{(\alpha)}(n)$ can be defined based on a basic sequence $b_{u,v}(n)$ and a cyclic shift $\alpha$.

$$r_{u,v}^{(\alpha)}(n) = e^{j\alpha n} b_{u,v}(n), \quad 0 \leq n < M_{sc}^{RS} \qquad \text{<Equation 2>}$$

In Equation 2, $M_{sc}^{RS}$ ($1 \leq m \leq N_{RB}^{max,UL}$) is the length of a reference signal sequence, and $M_{sc}^{RS} = m \ast N_{sc}^{RB}$. $N_{sc}^{RB}$ is the size of a resource block indicated by the number of subcarriers in the frequency domain and $N_{RB}^{max,UL}$ is a maximum value of an uplink bandwidth indicated by a multiple of $N_{sc}^{RB}$. A plurality of reference signal sequences may be defined by differently applying, a cyclic shift value, from one basic sequence.

The basic sequence $b_{u,v}(n)$ is divided into a plurality of groups, and in this case, $u \in \{0, 1, \ldots, 29\}$ is a group index and v is a basic sequence index in a group. A basic sequence is dependent upon the length ($M_{sc}^{RS}$) of the basic sequence. Each group includes one basic sequence (v=0) having a length of $M_{sc}^{RS}$ with respect to m ($1 \leq m \leq 5$), and includes two basic sequences (v=0, 1) having a length of $M_{sc}^{RS}$ with respect to m ($6 \leq m \leq n_{RB}^{max,UL}$). The sequence group index u and the basic sequence index v of a group may change over time like group hopping or sequence hopping (to be described).

In the SRS sequence, u is a PUCCH sequence group index, and v is a basic sequence index. The cyclic shift value is defined by Equation 3 shown below:

$$\alpha = 2\pi \frac{n_{SRS}^{cs}}{8} \qquad \text{<Equation 3>}$$

In Equation 3, $n_{SRS}^{cs}$ is a value configured by an higher layer with respect to each UE, which may be any one of integers 0 to 7.

In order to satisfy the transmission power $P_{SRS}$, the SRS sequence is multiplied by an amplitude scaling factor $\beta_{SRS}$ and then mapped to a resource element. The SRS sequence may be mapped, starting from $r_{SRS}(0)$, to a resource element (k,l) according to Equation 4 shown below:

$$a_{2k+k_0, l} = \begin{cases} \beta_{SRS} r^{SRS}(k) & k = 0, 1, \ldots, M_{sc,b}^{RS} - 1 \\ 0 & \text{otherwise} \end{cases} \qquad \text{<Equation 4>}$$

In Equation 4, $k_0$ is a starting position in the frequency domain of the SRS, and $M_{sc,b}^{RS}$ is the length of the SRS sequence defined by Equation 5 shown below:

$$M_{sc}^{RS} = m_{SRS,b} N_{sc}^{RB} / 2 \qquad \text{<Equation 5>}$$

In Equation 5, $m_{SRS,b}$ be given by Table 1 to Table 4 (to be described) with respect to each uplink bandwidth $N_{RB}^{UL}$.

In Equation 4, $k_0$ can be defined by Equation 6 shown below:

$$k_0 = k'_0 + \sum_{b=0}^{B_{SRS}} 2M_{sc,b}^{RS} n_b \qquad \langle \text{Equation 6} \rangle$$

In Equation 6, $k_0'$ is given as $$k_0' = (\lfloor N_{RB}^{UL}/2 \rfloor - m_{SRS,0}/2) N_{SC}^{RB} + k_{TC}$$

in a normal uplink subframe. $k_{TC} \in \{0, 1\}$ is a parameter given to the UE by an higher layer, and $n_b$ is a frequency position index.

Frequency hopping of the SRS is configured by $b_{hop} \in \{0, 1, 2, 3\}$. When frequency hopping of the SRS is not available ($b_{hop} \geq B_{SRS}$), it is determined by the constant of the frequency position index $$n_b = \lfloor 4n_{RRC}/m_{SRS,b} \rfloor \bmod N_b,$$

and $n_{RRC}$ is given by the higher layer. When frequency hopping of the SRS is available ($b_{hop} < B_{SRS}$), the frequency position index $n_b$ may be determined by Equation 7 shown below:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \qquad \langle \text{Equation 7} \rangle$$

In Equation 7, $n_b$ is determined by Table 1 to Table 4 (to be described), and $F_b(n_{SRS})$ may be determined by Equation 8 shown below:

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \qquad \langle \text{Equation 8} \rangle$$

In Equation 8, $n_{SRS}$ indicates the number of UE-specific SRS transmissions, which may be determined by Equation 9 shown below:

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, & \text{for 2 ms SRS periodicity of frame structure 2} \\ \lfloor (n_f \times 10 + \lfloor n_s/2 \rfloor)/T_{SRS} \rfloor, & \text{otherwise} \end{cases} \qquad \langle \text{Equation 9} \rangle$$

In Equation 9, $T_{SRS}$ is UE-specific periodicity, $T_{offset}$ is an SRS subframe offset, and $T_{offset\_max}$ is a maximum value of $T_{offset}$ for a particular configuration of an SRS subframe offset. $T_{SRS}$ and $T_{offset}$ can be given by Table 7 and Table 8 shown below.

Table 1 to Table 4 show an example of SRS bandwidth configurations. A 3-bit cell-specific parameter may be broadcast in order to indicate a configuration of one of eight bandwidths. Also, a 2-bit UE-specific parameter may be given by an higher layer in order to indicate a configuration of one of four bandwidths.

Table 1 shows an example of $m_{SRS,b}$ and $N_b$ (b=0, 1, 2, 3) when an uplink bandwidth $N_{RB}^{UL}$ is within the range of $6 \leq N_{RB}^{UL} \leq 40$.

TABLE 1

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 2 shows an example of $m_{SRS,b}$ and $N_b$ (b=0, 1, 2, 3) when an uplink bandwidth $N_{RB}^{UL}$ is within the range of $40 \leq N_{RB}^{UL} \leq 60$.

TABLE 2

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 3 shows an example of $m_{SRS,b}$ and $N_b$ (b=0, 1, 2, 3) when an uplink bandwidth $N_{RB}^{UL}$ is within the range of $60 \leq N_{RB}^{UL} \leq 80$.

TABLE 3

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 4 shows an example of $m_{SRS,b}$ and $N_b$ (b=0, 1, 2, 3) when an uplink bandwidth $N_{RB}^{UL}$ is within the range of $80 \leq N_{RB}^{UL} \leq 110$.

TABLE 4

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Table 1 to Table 4, $C_{SRS} \in \{0, 1, 2, 3, 4, 5, 6, 7\}$, a cell-specific parameter, and $B_{SRS} \in \{0, 1, 2, 3\}$, a UE-specific parameter, are given by an higher layer.

Table 5 and 6 show examples of a cell-specific subframe configuration period parameter $T_{SFC}$ and a cell-specific subframe offset parameter $\Delta_{SFC}$ with respect to SRS transmission.

Table 5 shows an example of an SRS subframe configuration in the FDD system. According to Table 5, the SRS subframe configuration can be indicated by a parameter having a 4-bit length and the period of the SRS subframe may be any one of 1, 2, 5, and 10 subframes.

TABLE 5

| srsSubframeConfiguration | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |

TABLE 5-continued

| srsSubframeConfiguration | Binary | Configuration Period $T_{SFC}$ (subframes) | Transmission offset $\Delta_{SFC}$ (subframes) |
|---|---|---|---|
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 6 shows an example of an SRS subframe configuration in the TDD system.

TABLE 6

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

The operation by the UE for an SRS transmission is as follows.

When the UE transmits an SRS, transmission power $P_{SRS}$ in a subframe i can be determined by Equation 10 shown below.

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\}$$ <Equation 10>

In Equation 10, $P_{CMAX}$ is pre-determined transmission power of the UE. $P_{SRS\_OFFSET}$ is a UE-specific parameter having a 4-bit length semi-statically determined by an higher layer. When Ks=1.25, $P_{SRS\_OFFSET}$ may be determined in units of 1 dB within the range of [−3, 12] dB. When Ks=0, $P_{SRS\_OFFSET}$ may be determined in units of 1.5 dB within the range of [−10.5, 12] dB. $M_{SRS}$ is a bandwidth of an SRS transmission indicated by the number of resource blocks, and $P_{O\_PUSCH}(j)$ is a parameter configured by the sum of $P_{O\_NOMINAL\_PUSCH}(j)$, a cell-specific nominal component given by an higher layer, and $P_{O\_UE\_PUSCH}(j)$, a UE-specific component also given by the higher layer. $\alpha(j)$ is a 3-bit cell-specific parameter given by the higher layer, PL is an estimated value of pathloss calculated by the UE, and $f(i)$ indicates a current power control adjustment state with respect to the PUSCH.

In case in which the UE can select a transmission antenna, an index of a UE antenna $a(n_{SRS})$ for transmitting SRS during an $n_{SRS}$ time is given as $a(n_{SRS}) = n_{SRS} \bmod 2$ with respect to the entire sounding bandwidth or a partial sounding bandwidth when frequency hopping is not available, and it may be given by Equation 11 shown below when frequency hopping is available.

$$a(n_{SRS}) = \begin{cases} (n_{SRS} + \lfloor n_{SRS}/2 \rfloor + \beta \cdot \lfloor n_{SRS}/K \rfloor) \bmod 2 & \text{mod2 when } K \text{ is even} \\ n_{SRS} \bmod 2 & \text{when } K \text{ is odd} \end{cases}$$ <Equation 11>

In Equation 11, $B_{SRS}$ is an SRS bandwidth and $b_{hop}$ is a frequency hopping bandwidth, $N_b$ may be determined by a predetermined table according to $C_{SRS}$ and $B_{SRS}$, and $$K = \prod_{b'=b_{hop}}^{B_{SRS}} N_{b'}.$$

In Equation 11, $\beta$ can be determined by Equation 12 shown below:

$$\beta = \begin{cases} 1 & \text{where } K \bmod 4 = 0 \\ 0 & \text{otherwise} \end{cases}$$ <Equation 12>

In the TDD system, when a single SC-FDMA symbol exists in a UpPTS (Uplink Pilot Time Slot), the corresponding SC-FDMA symbol can be used for the SRS transmission. When two SC-FDMA symbols exist in the UpPTS, the corresponding two SC-FDMA symbols can be all used for the SRS transmission and can be simultaneously allocated to a single UE.

When the SRS transmission and the transmission of the PUCCH format 2/2a/2b concurrently occur in the same subframe, the UE does not transmit the SRS anytime.

In case in which the ackNackSRS-SimultaneousTransmission parameter is false, when the SRS transmission and the transmission of the PUCCH carrying the ACK/NACK and/or the positive SR are preformed in the same subframe, the UE do not always transmit the SRS. Also, In case in which the ackNackSRS-SimultaneousTransmission parameter is true, when the SRS transmission and the transmission of the PUCCH carrying the ACK/NACK and/or the positive SR are configured in the same subframe, the UE uses a shortened PUCCH format and simultaneously transmits the PUCCH carrying the ACK/NACK and/or positive SR and the SRS. Namely, when the PUCCH carrying the ACK/NACK and/or positive SR is configured in the SRS subframe which is set to be cell-specific, the UE uses the shortened PUCCH format and simultaneously transmits the PUCCH carrying the ACK/NACK and/or positive SR and the SRS. When the SRS transmission overlaps with a PRACH (Physical Random Access Channel) for a preamble format 4 or when it exceeds the range of the uplink system bandwidth configured in the cell, the UE does not transmit the SRS.

The parameter, ackNackSRS-SimultaneousTransmission, given by the higher layer determines whether or not the UE supports simultaneous transmission of the PUCCH carrying the ACK/NACK and the SRS in a single subframe. When the UE is configured to simultaneously transmit the PUCCH carrying the ACK/NACK and the SRS in a single subframe, the UE can transmit the ACK/NACK and the SRS in a cell-specific SRS subframe. At this time, the shortened PUCCH format may be used, and a transmission of an SR or ACK/

NACK corresponding to a position at which the SRS is transmitted is omitted (or punctured). When shortened PUCCH format is used in the cell-specific SRS subframe even when the SRS is not transmitted in the corresponding subframe. When the UE is configured not to simultaneously transmit the PUCCH carrying the ACK/NACK and the SRS in a single subframe, the UE may use a general PUCCH format 1/1a/1b in order to transmit the ACK/NACK and SR.

Table 7 and Table 8 show an example of a UE-specific SRS configuration indicating an SRS transmission period $T_{SRS}$ and a subframe offset $T_{offset}$. The SRS transmission period $T_{SRS}$ may be determined to be any one of {2, 5, 10, 20, 40, 80, 160, 320} ms.

In case in which $T_{SRS} > 2$ in the TDD system and in case of the FDD system, the SRS subframe satisfies $(10*n_f + k_{SRS} - T_{offset}) \mod T_{SRS} = 0$. $n_f$ indicates a frame index, and $k_{SRS}$ is a subframe index in a frame in the FDD system. In the TDD system, when $T_{SRS} = 2$, two SRS resources can be configured in a half frame including at least one uplink subframe and the SRS subframe satisfies $(k_{SRS} - T_{offset}) \mod 5 = 0$.

In the TDD system, $k_{SRS}$ may be determined as shown in Table 9 below.

TABLE 9

| | | subframe index n | | | | | | | | | |
|---|---|---|---|---|---|---|---|---|---|---|---|
| | | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-36 | 20 | $I_{SRS}-17$ |
| 37-76 | 40 | $I_{SRS}-37$ |
| 77-156 | 80 | $I_{SRS}-77$ |
| 157-316 | 160 | $I_{SRS}-157$ |
| 317-636 | 320 | $I_{SRS}-317$ |
| 637-1023 | reserved | reserved |

Table 8 shows an example of an SRS configuration in the TDD system.

TABLE 8

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}-10$ |
| 15-24 | 10 | $I_{SRS}-15$ |
| 25-44 | 20 | $I_{SRS}-25$ |
| 45-84 | 40 | $I_{SRS}-45$ |
| 85-164 | 80 | $I_{SRS}-85$ |
| 165-324 | 160 | $I_{SRS}-165$ |
| 325-644 | 320 | $I_{SRS}-325$ |
| 645-1023 | reserved | reserved |

Meanwhile, when a transmission of the PUSCH corresponding to a re-transmission of the same transport block is performed in the same subframe as part of the SRS transmission and a certain access response grant or a contention-based access procedure, the UE does not transmit the SRS anytime.

The SRS transmission method may be classified into two types of methods: A periodic SRS transmission method, defined in LTE rel-8, for periodically transmitting the SRS according to an SRS parameter received through RRC (Radio Resource Control) signaling; and an aperiodic SRS transmission method for transmitting the SRS as necessary based on a dynamically triggered message from the BS. The aperiodic SRS transmission method may be introduced to the LTE-A.

Meanwhile, in the periodic SRS transmission method and the aperiodic SRS transmission method, the SRS may be transmitted in a particular SRS subframe which has been determined to be UE-specific. In the period SRS transmission method defined in the LTE rel-8, cell-specific SRS subframes are periodically set by a cell-specific SRS parameter, and a periodic SRS is transmitted in a periodic UE-specified SRS subframe set by a UE-specific SRS parameter among the cell-specific SRS subframes. In this case, the periodic UE-specific SRS subframe may be a certain subset of the cell-specific SRS subframes. The cell-specific SRS parameter may be given by the higher layer. In the aperiodic SRS transmission method, an aperiodic SRS may be transmitted in an aperiodic UE-specific SRS subframe determined by a UE-specific aperiodic SRS parameter. The aperiodic UE-specific SRS subframe of the aperiodic SRS transmission method may be a subset of the cell-specific SRS subframes defined in the LTE rel-8. Or, the aperiodic UE-specific SRS subframe may be the same as the cell-specific SRS subframe. Like the cell-specific SRS parameter, the UE-specific aperiodic SRS parameter can be also given by the higher layer. The UE-specific aperiodic SRS subframe may be set by the sub-frame period and subframe offset in Table 7 and Table 8.

In order to trigger the aperiodic SRS transmission of the UE, the BS may transmit a triggering signal to the UE. To this end, various methods for transmitting the triggering signal of the aperiodic SRS may be proposed.

First, the signal for triggering the aperiodic SRS transmission of the UE may be transmitted through a bit newly defined in the DCI format 0 or 1A. The size of aperiodic SRS triggering bit in the DCI format 0 or 1A may be 1 bit. When the aperiodic SRS triggering bit is 1 bit, any one of two status which can be indicated by the aperiodic SRS triggering bit may be set to trigger a transmission of the aperiodic SRS and the other may be set not to trigger the transmission of the aperiodic SRS.

1 bit added in this case may independently exist from 3-bit carrier index field (CIF) defined in the DCI format 0 or 1A for cross-carrier scheduling in a carrier aggregation system. As the aperiodic SRS transmission triggering bit and the CIF are newly defined, the size of the DCI format 0 or 1A of the LTE-A may be greater than that of the DCI format 0 or 1A of the existing LTE rel-8. As the size of the DCI format 0 or 1A is increased by the aperiodic SRS triggering bit and the CIF, the LTE-A UE can blind-decodes the PDCCH in a UE-specific search space, rather than in a UE-common search space. The size of the DCI format 0 or 1A in the PDCCH desired to be detected by the LTE-A UE from the USS may be greater by 1 bit or 4 bits than the size of the DCI format 0 or 1A of the existing LTE rel-8. When only the aperiodic SRS transmission triggering bit is included in the DCI format 0 or 1A, the size of the DCI format 0 or 1A in the PDCCH may be 1-bit greater, and when both the aperiodic SRS transmission triggering bit and the CIF are included in the DCI format 0 or 1A, the size of the DCI format 0 or 1A in the PDCCH may be 4-bit greater. Since the LTE-A UE detects the DCI format 0 or 1A having the increased size in the USS, the number of times of blind decoding by the UE does not increase. Meanwhile, in the above description, it is assumed that the aperiodic SRS triggering bit is added to the DCI format 0 or 1A, but the aperiodic SRS triggering bit may be added to a DCI format defined for a UL MIMO or a DCI format or a DL DCI format which may be defined to support a UL non-contiguous transmission in the LTE-A.

The aperiodic SRS triggering signal newly defined in the DCI format 0 or 1A may be activated by an aperiodic SRS activation signal. Namely, the aperiodic SRS activation signal may be used in order to indicate whether or not the aperiodic SRS is triggered by the aperiodic SRS triggering bit in the DCI format 0 or 1A. The aperiodic SRS activation signal may be RRC-signaled. The size of the aperiodic SRS activation signal may be 1 bit. Namely, when the value of the aperiodic SRS activation signal is 1, an aperiodic SRS triggering bit indicating triggering of the aperiodic SRS in the DCI format 0 or 1A can be defined. Meanwhile, such an activation of the aperiodic SRS may not be supported in the UE-common search space.

Meanwhile, when the aperiodic SRS triggering bit is defined in the DCI format 0 or 1A, a UL grant may not be transmitted. Namely, there may be a case in which the DCI format 0 or 1A is transmitted, but there is no transmission of the PUSCH corresponding thereto. In such a case, it is required to indicate that the UL grant is not transmitted, and the indication may be made by using an unused state or a code point, or any one of code points in a combination of a plurality of code points. As for the unused state or code point, for example, an unused state of a resource allocation field in the DCI format 0 or 1A may be used. Or, an unused state of a CQI request field, MCS and RV fields, a new data indicator field, or the like, may be used. In this manner, the fact that there is no a PUSCH transmission can be indicated by using the unused state of the DCI format 0 or 1A or a code point, and remaining bits may be used for parameters for the aperiodic SRS. In this case, the parameters may include, for example, all the parameters for a transmission of the aperiodic SRS, or some of the parameters for a transmission of the aperiodic SRS. For example, UE-specific parameters, among the parameters for a transmission of the aperiodic SRS, may be included. Or, only a particular parameter which is required to be dynamically changed, among the UE-specific parameters, may be included.

Or, in order to trigger a transmission of the aperiodic SRS, a new DCI format may be defined. The new DCI format may be called an aperiodic SRS-dedicated DCI format. When the aperiodic SRS-dedicated DCI format is defined, the aperiodic SRS-dedicated DCI format may include only aperiodic SRS triggering bits. Or, the aperiodic SRS-dedicated DCI format may include all the parameters for the transmission of the aperiodic SRS. The parameter for the transmission of the aperiodic SRS may be the same parameter as that defined for the transmission of the periodic SRS. Namely, the parameter for the transmission of the aperiodic SRS may include a cyclic shift value of the aperiodic SRS, resource allocation information, a hopping flag, and the like. Or, the aperiodic SRS-dedicated DCI format may include some of parameters for the transmission of the aperiodic SRS. For example, a cell-specific parameter, among the parameters for the transmission of the aperiodic SRS, may be transmitted through RRC signaling, and a UE-specific parameter may be included in the aperiodic SRS-dedicated DCI format so as to be transmitted. Or, only a particular parameter which is required to be dynamically changed, among UE-specific parameters, may be included in the aperiodic SRS-dedicated DCI format.

In case of defining the aperiodic SRS-dedicated DCI format, the size of the aperiodic SRS-dedicated DCI format is required to be equal to the size of the existing DCI format 0 or 1A in order not to increase the number of times of blind decoding in detecting the DCI format 0 or 1A by the UE. In this case, an aperiodic SRS triggering bit may be defined in the DCI format 0. A special state of a particular field among all the fields in the DCI format 0 may be used to trigger the aperiodic SRS. The particular field may be any one of a frequency hopping flag field, a resource block assignment and hopping resource allocation field, a modulation and coding scheme and redundancy version field, a new data indicator field, a TPC command field for a scheduled PUSCH, a cyclic shift for a DMRS, and a CQI request. The pre-designated particular state among the enumerated particular fields in the DCI format 0 may indicate triggering of the aperiodic SRS or a configuration of the aperiodic SRS. Also, the pre-designated particular state may be indicated by a message transmitted to the RRC.

Or, a signal triggering the transmission of the aperiodic SRS may be simultaneously transmitted when a UL grant for scheduling of a PUSCH transmission is transmitted. There are two resource allocation methods for the PUSCH transmission: One is a contiguous allocation which obtains a diversity gain by using frequency dependent scheduling employed in the LTE rel-8/9, and the other is a non-contiguous allocation which can be employed in the LTE-A. In order to obtain frequency diversity in the contiguous allocation of the PUSCH resource frequency between slots or subframes can be employed, and in order to indicate this, a frequency hopping flag field having a 1-bit size is defined in the DCI format 0. However, in the non-contiguous allocation of the PUSCH resource, a great gain cannot be obtained although the frequency hopping between slots and subframes is employed, so the frequency hopping flag field of the DCI format 0 remains as an unused field (or an unused bit).

Thus, frequency hopping flag field not used in the non-contiguous allocation of the PUSCH resource may be used as an aperiodic SRS triggering bit. Accordingly, the aperiodic SRS triggering bit and the UL grant for the PUSCH transmission can be advantageously simultaneously transmitted. In this case, a UE-specific parameter, a cell-specific parameter, and a component carrier-specific parameter, and the like, required for the transmission of the aperiodic SRS can be set as RRC parameters and RRC-signaled. Meanwhile, when the DCI format 0 for the non-contiguous allocation of the PUSCH resource and the DCI format 0 for the contiguous allocation of the PUSCH resource of the LTE rel-8/9 have the same size, 0 bit may be padded to the DCI format 0 in order to adjust the size of the DIC format 0 an that of the DCI format 1A.

Figure 6:
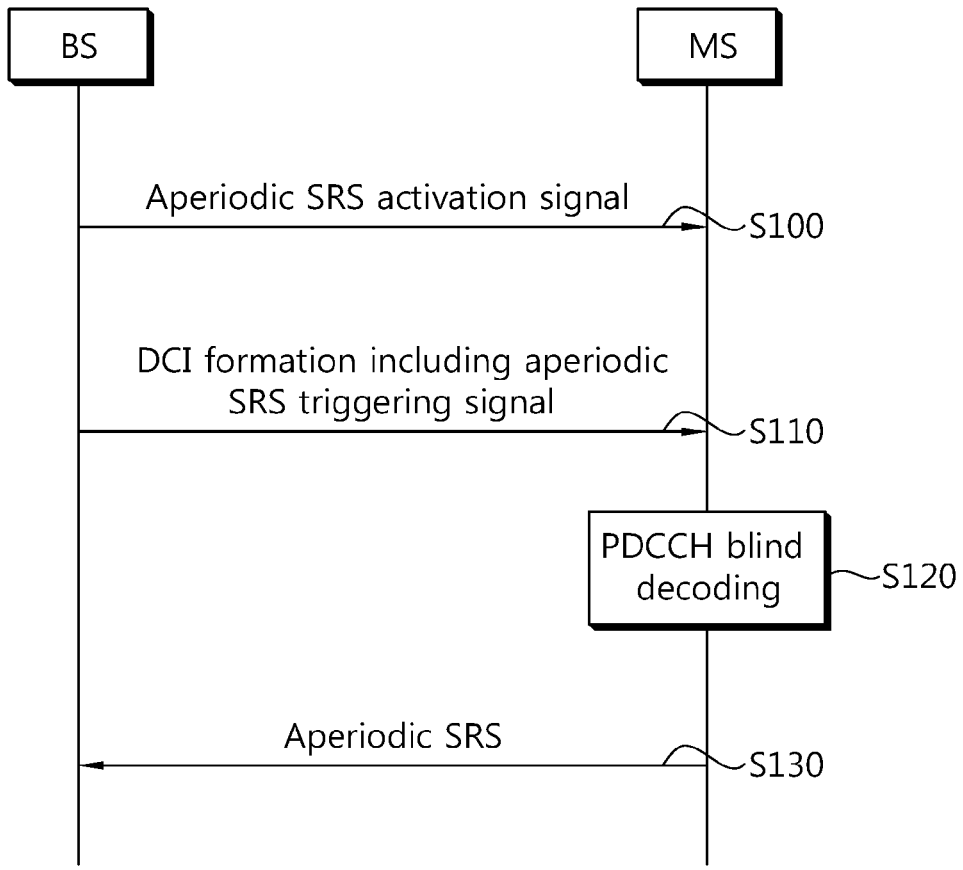
FIG. 6 is a flow chart illustrating the process of the proposed method for transmitting an aperiodic SRS.

FIG. 6 is a flow chart illustrating the process of the proposed method for transmitting an aperiodic SRS.

In step S100, the UE receives an aperiodic SRS activation signal for activating a transmission of an aperiodic SRS from the BS. In step S110, the UE receives a DCI format 0 or 1A including an aperiodic SRS triggering signal for triggering a transmission of the aperiodic SRS from the BS via a PDCCH. In step S120, the UE blind-decodes the PDCCH in a UE-specific search space. In step S130, the UE transmits the aperiodic SRS to the BS on the basis of the aperiodic SRS triggering signal.

Figure 7:
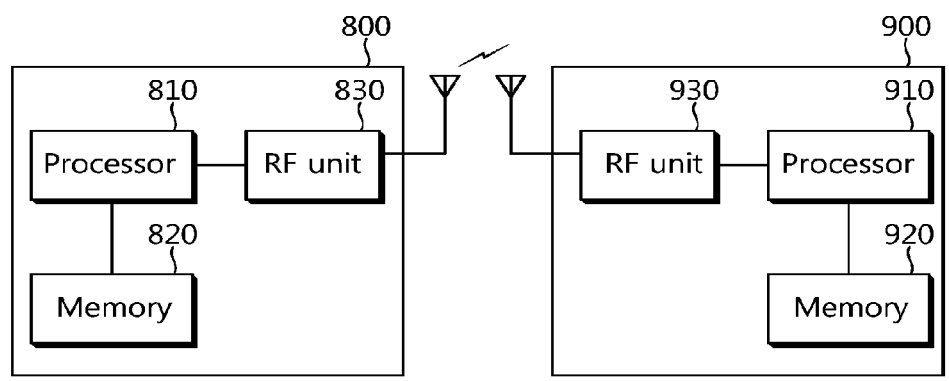
FIG. 7 is a block diagram showing wireless communication system to implement an embodiment of the present invention.

FIG. 7 is a block diagram showing wireless communication system to implement an embodiment of the present invention.

A BS 800 includes a processor 810, a memory 820, and an RF (Radio Frequency) unit 830. The processor 810 may be configured to implement proposed functions, procedures, and/or methods in this description. Layers of the radio interface protocol may be implemented in the processor 810. The processor 810 is configured to transmit an aperiodic SRS activation signal for activating a transmission of an aperiodic SRS, and transmit a DCI format 0 or 1A including an aperiodic SRS triggering signal for triggering the transmission of the aperiodic SRS via a PDCCH. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The processor 910 is configure to receive a DCI format 0 or 1A including an aperiodic SRS activation signal and an aperiodic SRS triggering signal via a PDCCH. Also, the processor 910 is configured to transmit the aperiodic SRS which has been triggered based on the triggering signal. The memory 920 is operatively coupled with the processor 910 and stores a variety of information to operate the processor 910. The RF unit 930 is operatively coupled with the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting an aperiodic sounding reference signal (SRS) by a user equipment (UE) in a wireless communication system, the method comprising:
receiving, from a base station (BS) through a radio resource control (RRC) layer, an aperiodic SRS activation signal indicating whether or not transmission of an aperiodic SRS is triggered by a triggering bit included in a downlink control information (DCI) format;
receiving the DCI format including the triggering bit for triggering transmission of the aperiodic SRS from the BS via a physical downlink control channel (PDCCH) if the aperiodic SRS activation signal indicates that the transmission of the aperiodic SRS is triggered by the triggering bit;
decoding the PDCCH in a UE-specific search space;
detecting the triggering bit in the UE-specific search space; and
transmitting the aperiodic SRS to the BS.

2. The method of claim 1, wherein the DCI format includes a DCI used for scheduling a physical uplink shared channel (PUSCH), or includes a DCI used for scheduling a single physical downlink shared channel (PDSCH) codeword.

3. The method of claim 1, wherein the DCI format includes cyclic redundancy checking (CRC) masked by a cell radio network temporary identifier (C-RNTI).

4. The method of claim 1, wherein the triggering bit has a size of 1 bit.

5. The method of claim 4, wherein the transmission of the aperiodic SRS is triggered if the value of the triggering bit is 1.

6. The method of claim 1, wherein the aperiodic SRS activation signal has a size of 1 bit.

7. The method of claim 1, wherein the DCI format includes at least one parameter defining the aperiodic SRS.

8. The method of claim 2, wherein the triggering bit is mapped to a frequency hopping flag field of the DCI format including the DCI used for scheduling the PUSCH so as to be received.

9. The method of claim 1, wherein the DCI format is mapped to an information bit, has cyclic redundancy checking (CRC) added thereto, performs channel coding, is subjected to rate matching, and then is received.

10. A user equipment (UE) in a wireless communication system, the UE comprising:

a radio frequency (RF) unit; and a processor, coupled to the RF unit, and configured to:

receive, from a base station (BS) through a radio resource control (RRC) layer, an aperiodic sounding reference signal (SRS) activation signal indicating whether or not transmission of an aperiodic SRS is triggered by a triggering bit included in a downlink control information (DCI) format;

receive the DCI format including the triggering bit for triggering transmission of the aperiodic SRS from the BS via a physical downlink control channel (PDCCH) if the aperiodic SRS activation signal indicates that the transmission of the aperiodic SRS is triggered by the triggering bit;

decode the PDCCH in a UE-specific search space;

detect the triggering bit in the UE-specific search space; and transmit the aperiodic SRS to the BS.

11. The UE of claim 10, wherein the DCI format includes a DCI used for scheduling a physical uplink shared channel (PUSCH), or includes a DCI used for scheduling a single physical downlink shared channel (PDSCH) codeword.

12. The UE of claim 10, wherein the DCI format includes cyclic redundancy checking (CRC) masked by a cell radio network temporary identifier (C-RNTI).

13. The UE of claim 10, wherein the triggering bit has a size of 1 bit.

14. The UE of claim 13, wherein the transmission of the aperiodic SRS is triggered when the value of the triggering bit is 1.

15. The UE of claim 10, wherein the aperiodic SRS activation signal has a size of 1 bit.

\* \* \* \* \*